United States Patent [19]

Abbott

[11] 4,363,223
[45] Dec. 14, 1982

[54] APPARATUS FOR PRODUCING AND DISPENSING COLD PRODUCTS

[75] Inventor: Ronald L. Abbott, Palo Alto, Calif.

[73] Assignee: Inventco Sales Limited, Vancouver, Canada

[21] Appl. No.: 278,196

[22] Filed: Jun. 29, 1981

[30] Foreign Application Priority Data

Aug. 26, 1980 [CA] Canada .................................. 359071

[51] Int. Cl.³ ........................... F28G 1/16; F25C 5/12
[52] U.S. Cl. ....................................... 62/303; 62/347; 62/354; 134/168 R; 134/171
[58] Field of Search ................... 62/74, 347, 354, 342, 62/303; 134/168 R, 166 R, 167 R, 171; 165/95

[56] References Cited

U.S. PATENT DOCUMENTS

| | | | |
|---|---|---|---|
| 2,013,501 | 9/1935 | Parker | 62/303 X |
| 2,526,265 | 10/1950 | Nulph | 134/171 X |
| 3,273,585 | 9/1966 | Patch | 62/303 X |
| 3,638,448 | 2/1972 | Raymer | 62/303 X |
| 3,729,177 | 4/1973 | Keyes et al. | 134/166 R X |
| 3,765,190 | 10/1973 | Abbott | 62/233 |
| 3,921,652 | 11/1975 | Schmid | 134/171 X |
| 4,058,383 | 11/1977 | Peterson | 62/303 X |
| 4,276,750 | 7/1981 | Kawasuumi | 62/354 X |

*Primary Examiner*—William E. Tapolcai
*Attorney, Agent, or Firm*—Owen, Wickersham & Erickson

[57] ABSTRACT

An apparatus for producing and dispensing a cold product comprises a scraper member operable to scrape a forming wall which is maintained near or below freezing temperature. A substance comprising the product in fluid form is directed to the scraper member and sprayed onto the forming wall during relative movement between the piston member and the wall where it forms a thin layer and the scraper removes the formed product. A cleansing fluid is selectively supplied in one instance to cleanse the apparatus between different substances dispensed, and in another instance, to cleanse and sanitize the apparatus.

2 Claims, 3 Drawing Figures

U.S. Patent   Dec. 14, 1982   4,363,223
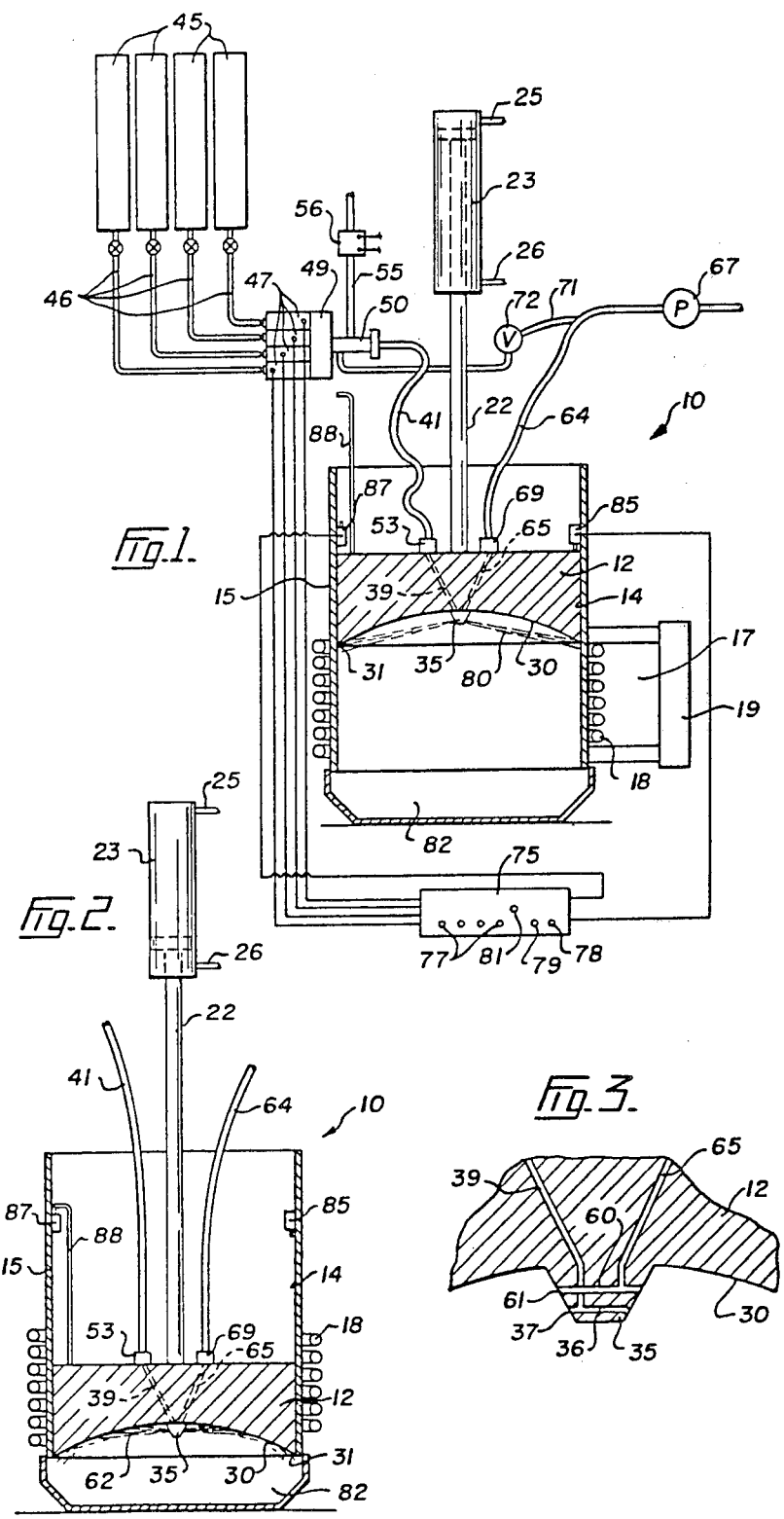

APPARATUS FOR PRODUCING AND DISPENSING COLD PRODUCTS

BACKGROUND OF THE INVENTION

This invention relates to apparatus for producing and dispensing cold products and particularly, frozen products such as confections, food products that can be sprayed, and drinks.

The present apparatus can handle any product that is either liquid or in such form that it can be sprayed. This apparatus is an improvement over the apparatus disclosed in U.S. Pat. No. 3,765,190 issued Oct. 16, 1973. The patented apparatus works quite well, but the frozen product is not always as consistent as it might be, and some portions of it may be frozen harder than other portions. In addition, the patented apparatus is relatively slow, and sometimes the flavor or color of a produced product is altered by the flavor or color of the product previously frozen and dispensed.

The above noted disadvantages have been overcome or greatly reduced by the apparatus of this invention. The pressure of the substance to be dispensed in the present apparatus is raised to a predetermined and constant level and then sprayed onto a cold wall at that pressure, and the formed substance is scraped off the wall at a constant rate so that the temperature of the product is constant throughout. Furthermore, the apparatus is provided with a cleansing system, as a result of which when it is desired to change the product being formed, all traces of the last product can be removed. There is also a cleansing system for completely cleansing and sanitizing the apparatus.

Although this apparatus can be used for producing products at temperatures above the freezing level, it is primarily intended for frozen products and will be so described herein. For example, some products become relatively stiff at cold temperatures above freezing.

SUMMARY OF THE INVENTION

Apparatus for producing and dispensing cold products in accordance with the present invention comprises a forming wall, refrigerating means for maintaining the forming wall near or below freezing temperature, a scraper retained in scraping engagement with the wall, power means for creating relative movement between the scraper and the wall, a first spray nozzle mounted adjacent the forming wall and directed towards said wall, supply means for selectively making available for the nozzle a predetermined quantity of a substance in fluid form and at a predetermined and constant pressure, and control means operable to supply said substance at the constant pressure to the nozzle during relative movement between the scraper member and the wall, said nozzle spraying the substance at an even rate over the forming wall during said relative movement, and said sprayed substance being formed in an even layer on the wall and being scraped off the wall by said scraper. In a preferred form of the invention the scraper is supported by a scraper member and this preferably is a piston, in which case the forming wall is a cylinder in which the piston is reciprocated.

BRIEF DESCRIPTION OF THE DRAWING

A preferred form of this invention is illustrated in the accompanying drawings, in which:

FIG. 1 is a diagrammatic sectional view of this apparatus with a scraper piston in one position;

FIG. 2 is a fragmentary view similar to FIG. 1 with the piston at the end of its scraping stroke and in its normal at rest position, and FIG. 3 is an enlarged sectional view of the spray nozzles of this apparatus.

DETAILED DESCRIPTION OF EMBODIMENT

Referring to the drawings, 10 is apparatus for producing and dispensing cold or frozen products having a scraper member or piston 12 mounted for reciprocation over a forming wall 14 which, in this example, is the inner surface of a cylinder 15 in which the piston is slidably mounted. Wall 14 is maintained near or below freezing temperature in any suitable manner, such as by a refrigerating system 17 made up of a freezing coil 18 surrounding the cylinder and a refrigerating unit 19. The temperature of the forming wall is preferably from about 32° F. to minus 20° F. However, for some purposes it may be higher.

Either piston 12 or cylinder 15 is reciprocated and in this example, the piston is reciprocated relative to the cylinder at a constant speed in any suitable manner. The illustrated piston has a piston rod 22 projecting upwardly therefrom into a hydraulic cylinder 23, and operating fluid is fed into and removed from opposite ends of the cylinder through pipes 25 and 26. The controls and pressure system for cylinder 23 are standard and do not require a description herein. An advantage of this form of drive for scraper piston 12 is that the piston can be moved in its cylinder at a constant speed, and another advantage is that it can be moved at one speed during its downward movement and at a different speed during its upward movement.

Piston 12 is preferably formed with a concave outer end or bottom 30, and this bottom forms an annular scraper 31 at the peripheral edge thereof. This scraper 31 is in constant engagement with the annular forming wall 14 of the cylinder, and scrapes said wall during downward movement of the piston relative to the wall.

A nozzle head 35 is located centrally of the piston bottom 30 and includes therein a first nozzle 36 in the form of a plurality of radially arranged openings 37 which are directed radially and downwardly towards the forming wall 14 so as to spray laterally a complete 360° over the wall. The nozzle 36 is connected to a passage 39 in and extending through piston 12, and a flexible tube 41 is connected to said passage.

Suitable means is provided for directing one or more substances to be cooled or frozen and dispensed to nozzle 36. In this example, the apparatus is capable of handling four different substances, and there are four stock containers 45 with flexible pipes or tubes 46 leading therefrom to respective control and metering valves 47. These valves are selectively operable to direct the selected substance to a pump 49, the outlet of which is connected to a pipe 50. The flexible tube 41 is connected to the outer end of pipe 50 so that when pump 49 is operated, a selected substance is directed from its container 45 into tube 41, whence it can travel through passage 39 to nozzle 36 which sprays the substance onto the forming wall 14 of cylinder 15. This nozzle may be such that it atomizes the substance being directed onto the forming wall. If containers 45 are pressurized, pump 49 is not required.

A normally closed solenoid valve 53 is provided to stop the substance in tube 41, and is operable to release said substance. This valve is preferably mounted near piston 12, and in this example, is on the piston at said tube. When pump 49 is operated, or if the containers 45 are pressurized and a selected valve 47 is opened, a predetermined volume of a selected substance is directed into tube 41 where it is retained by valve 53. It is desirable to raise the pressure of this substance to a predetermined level before it is directed to nozzle 36. For this purpose, a pipe 55 extends from a suitable source of gas such as air (not shown) to pipe 50 and a valve 56 in pipe 55 is operable to allow the gas to enter pipe 50 and tube 41 to pressurize the substance in the latter. When valve 53 is opened, the pressurized substance is released and is directed to the nozzle 36 at the predetermined pressure, valve 56 remaining open at this time.

Each substance to be frozen travels from its respective container 45 through a continuous passage in one of the pipes 46, a valve 47, pump 49, pipe 50, tube 41, valve 53, passage 39 and nozzle 36. It is desirable to have this passage coated with a suitable sanitary material such as teflon or silicon.

Apparatus 10 is provided with a cleansing system which is operable when it is desired to change the substance being dispensed to be sure that said substance is not affected by the last substance handled by the apparatus. For this purpose, a second nozzle 60 is provided in head 35 and this nozzle includes radial openings 61 which are located so as to direct a cleansing fluid over the bottom 30 of piston 12 while the latter is stationary at the bottom of the cylinder, as indicated at 62 in FIG. 2. A flexible tube 64 extends from a suitable source (not shown) of cleansing fluid, such as water, to a passage 65 through piston 12 which leads to nozzle 60 in head 35. A suitable pump, such as a demand pump 67, is connected to cleansing tube 64, and a suitable normally closed valve 69 on piston 12 controls the outflow from tube 64 to passage 65.

If desired, a bypass pipe 71 can extend from tube 64 to pipe 50 near pump 49. A normally closed valve 72 is mounted in pipe 71.

Electric control systems which may be used in apparatus 10 are well known and do not require a detailed description herein. A control console 75 is provided and this console includes a control button 77 for each metering valve 47, a button 78 for starting a dispensing cycle in the apparatus, a control button 79 for starting a sanitizing step, and a button 81 for starting a between flavor cleansing step.

When a selected control button 77 is depressed, the valve 47 of that button, pump 49, if used, and valve 56 are sequentially operated. When valve 56 is operated, cylinder 23 is energized to start piston 12 moving upwardly in cylinder 15 from its at-rest position.

When the selected valve 47 and pump 49, if used, are energized, a charge of the selected substance is directed from its container 45 into tube 41 where it is retained by valve 53. Then valve 56 is operated to raise the pressure of this charge to a predetermined level, after which valve 53 is opened to permit the substance to be sprayed at that pressure by nozzle 36 onto forming wall 14. This wall is maintained near, at or below freezing temperature by the refrigerating system 17. Valve 56 remains open so that the air pressure is applied to the charge until all of the latter has been sprayed onto the forming wall. As this spraying action is taking place, piston 12 is moved upwardly in the cylinder at a constant speed. The substance under a predetermined and constant pressure is sprayed onto wall 14, as indicated at 80 in FIG. 1, where it is immediately frozen or its temperature lowered to the desired level. As the piston moves downward, the layer of material is scraped off the wall into a suitable container 82 held beneath the open lower end of cylinder 15. This sequence of steps is repeated until the required amount of the frozen substance is deposited in container 82. The electronic system (not shown) of this apparatus is such that each time a button 77 is depressed, the piston travels through a predetermined number of strokes so as to dispense a predetermined quantity of the product. It is preferable to time the various steps of the dispensing operation so that the substance is all gone during the last up stroke of the piston. Valve 56 remains open until the piston reaches the top of its stroke, thereby allowing air to blow out the passageway through which the substance travels to the spray nozzle. The piston stops at the bottom of the cylinder when each dispensing operation is completed. This in effect closes the bottom of the cylinder so as to help maintain the desired temperature at wall 14. Valve 56 closes when the piston comes to rest, and this valve is such that it vents to atmosphere when it closes.

The movement of piston 12 can be controlled in any desired manner. In this example, a limit switch 85 is engaged each time the piston reaches the end of its upward stroke, and the movement of the piston is reversed each time the switch is operated. Another limit switch 87 is provided within the cylinder and is engaged by a feeler 88 mounted on the upper end of the piston, each time the piston reaches the end of its downward stroke. This reverses the operation of cylinder 23 until the required number of strokes have been completed, at which time the piston stops at the bottom of the cylinder.

The apparatus can be periodically cleansed and sanitized, such as at the end of the day. For this purpose, the ends of tubes 46 are provided with well known quick release check and pressure couplings which fit into metering valves 47. When these couplings are pulled out, similar couplings connected to a pressure cleansing and sanitizing system may be inserted so said system can be operated to force a cleaning and sanitizing fluid through valves 47, pumps 49, pipe 50, tube 41, valve 53, passage 39 and spray nozzle 36. The refrigeration system is inoperative and the piston is moving at this time to insure cleansing of wall 14. The bottom of the piston, after the latter is stopped, can be wiped by hand or valve 69 can be opened to allow water to be sprayed over said piston bottom. Valve 72 can be opened to allow water to flush out the dispensing tube system.

The even spraying of the pressurized substance over the forming wall during relative movement between the piston and the wall insures an even layer of material forming on the wall. This and the constant speed of the relative movement results in an even freezing of the substance. In other words, the substance is not converted into ice on some areas while remaining relatively soft on others. Another advantage of apparatus 10 is that the piston can be moved at different speeds during its up and down strokes. The constant pressure of each charge of the substance being dispensed insures that exactly the same amount of substance is dispensed during each operation.

It is possible to operate apparatus 10 so that the substance is sprayed onto the forming wall and scraped off it during each downward stroke of the piston. However, it is preferable to spray the substance onto the forming wall during the upward movement of the piston and then to scrape it off during the downward movement.

Another alternative form of this invention is apparatus made up of a rotatable cylindrical drum with refrigerating apparatus mounted inside and near the drum peripheral wall. The outer surface of the drum constitutes the forming wall and the substance is sprayed by a nozzle onto said outer surface ahead of a scraper which is in scraping engagement with the surface. The drum is rotated at a constant speed and the substances are handled and directed to the nozzle in the manner described above.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for producing and dispensing cold products, comprising:
   a cylinder having an inner forming wall;
   a piston mounted for reciprocation in the cylinder and having a scraper in scraping engagement with the surrounding forming wall during movement of the piston, said scraper being at and surrounding the outer end of said piston;
   power means connected to the piston for moving said piston axially in the cylinder;
   a first spray nozzle mounted on an outer end of the piston and directed towards the forming wall around said end;
   supply means for selectively making available at the piston a predetermined quantity of a substance in fluid form at a predetermined and constant pressure;
   control means operable to supply the selected substance to the nozzle during movement of the piston, said first nozzle spraying the substances at an even rate over the forming wall during said movement, and said substance forming an even layer on the wall and being scraped off the wall by the scraper as the latter is moved by the piston over the wall with the substance thereon;
   a second spray nozzle mounted on the piston and directed towards the scraper, said first and second nozzles being positioned centrally of said outer end of said piston, and
   means for selectively supplying a cleansing fluid under pressure to the second nozzle, said second nozzle spraying the fluid over the scraper member and the scraper for cleansing purposes.

2. Apparatus as claimed in claim 1 in which the outer end of the piston is of concave formation, said scraper is at and surrounds the concave end, and said first and second nozzles are positioned centrally of said outer concave end.

* * * * *